United States Patent
Negro

(10) Patent No.: US 10,210,369 B2
(45) Date of Patent: Feb. 19, 2019

(54) MARK READER WITH REDUCED TRIGGER-TO-DECODE RESPONSE TIME

(71) Applicant: COGNEX CORPORATION, Natick, MA (US)

(72) Inventor: James A. Negro, Arlington, MA (US)

(73) Assignee: COGNEX CORPORATION, Natick, MA (US)

(*) Notice: Subject to any disclaimer, the term of this patent is extended or adjusted under 35 U.S.C. 154(b) by 0 days.

(21) Appl. No.: 15/862,052

(22) Filed: Jan. 4, 2018

(65) Prior Publication Data

US 2018/0129845 A1 May 10, 2018

Related U.S. Application Data

(63) Continuation-in-part of application No. 15/664,062, filed on Jul. 31, 2017, now abandoned, which is a continuation of application No. 15/082,459, filed on Mar. 28, 2016, now Pat. No. 9,721,134, which is a continuation of application No. 12/978,156, filed on Dec. 23, 2010, now Pat. No. 9,298,963.

(51) Int. Cl.
  *G06K 7/10* (2006.01)
  *G06K 7/14* (2006.01)

(52) U.S. Cl.
  CPC .......... *G06K 7/14* (2013.01); *G06K 7/10722* (2013.01); *G06K 7/10881* (2013.01); *G06K 7/1439* (2013.01)

(58) Field of Classification Search
  CPC .... G06K 7/14; G06K 7/1439; G06K 7/10544; G06K 7/10752; G06K 7/10881
  See application file for complete search history.

(56) References Cited

U.S. PATENT DOCUMENTS

| | | |
|---|---|---|
| 4,818,886 A | 4/1989 | Drucker |
| 5,117,098 A | 5/1992 | Swartz |
| 5,280,162 A | 1/1994 | Marwin |
| 5,302,812 A | 4/1994 | Li et al. |
| 5,600,121 A | 2/1997 | Kahn et al. |
| 5,612,529 A | 3/1997 | Coleman |
| 6,123,261 A | 9/2000 | Roustaei |
| 6,138,915 A | 10/2000 | Danielson et al. |
| 6,230,975 B1 | 5/2001 | Colley et al. |
| 6,695,209 B1 | 2/2004 | La |
| 6,729,546 B2 | 5/2004 | Roustaei |
| 7,097,102 B2* | 8/2006 | Patel ................. G06K 7/10722 235/454 |
| 7,347,374 B2 | 3/2008 | Zhu et al. |

(Continued)

FOREIGN PATENT DOCUMENTS

| CN | 201576291 U | 9/2010 |
|---|---|---|
| CN | 101877047 A | 11/2010 |

(Continued)

*Primary Examiner* — Thien M Le
*Assistant Examiner* — April Taylor

(57) ABSTRACT

Systems and methods for use with a handheld mark reader that reduce the time between activation of the reader's trigger and the reader returning a successful decode response. At least one pre-trigger image can be acquired and at least one pre-trigger image parameter determined. Post-trigger image acquisition or analysis of post-trigger images can be implemented based upon the at least one pre-trigger image parameter.

18 Claims, 9 Drawing Sheets

(56) References Cited

U.S. PATENT DOCUMENTS

| | | | |
|---|---|---|---|
| 7,389,933 B2 | 6/2008 | Wang | |
| 7,594,609 B2 | 9/2009 | Kotlarsky et al. | |
| 7,604,174 B2 | 10/2009 | Gerst, III et al. | |
| 7,611,060 B2 | 11/2009 | Wang et al. | |
| 7,617,984 B2 | 11/2009 | Nunnink | |
| 7,740,176 B2 | 6/2010 | Wang et al. | |
| 7,874,487 B2 | 1/2011 | Nunnink et al. | |
| 8,286,878 B2 | 10/2012 | Nunnink | |
| 8,387,884 B2 * | 3/2013 | Vinogradov | G06K 7/10811 235/462.42 |
| 9,292,724 B1 | 3/2016 | Flugge et al. | |
| 9,298,963 B2 * | 3/2016 | Negro | G06K 7/10722 |
| 9,405,951 B2 | 8/2016 | Nunnink et al. | |
| 9,600,703 B2 | 3/2017 | Wang et al. | |
| 9,721,134 B2 * | 8/2017 | Negro | G06K 7/14 |
| 2001/0027999 A1 * | 10/2001 | Lee | G06K 7/10732 235/462.45 |
| 2003/0168512 A1 | 9/2003 | Longacre, Jr. et al. | |
| 2006/0202036 A1 | 9/2006 | Wang et al. | |
| 2007/0002163 A1 * | 1/2007 | Madej | G06K 7/10 348/362 |
| 2010/0147956 A1 | 6/2010 | Wang et al. | |
| 2010/0187315 A1 * | 7/2010 | Goren | G06K 7/14 235/462.42 |
| 2012/0248195 A1 * | 10/2012 | Feng | G02B 3/14 235/472.01 |
| 2013/0221104 A1 * | 8/2013 | Wang | G06K 7/10722 235/462.25 |
| 2014/0204268 A1 * | 7/2014 | Grunow | H04N 5/23241 348/370 |
| 2016/0104021 A1 | 4/2016 | Negro et al. | |
| 2017/0351892 A1 | 12/2017 | Negro | |

FOREIGN PATENT DOCUMENTS

| | | |
|---|---|---|
| EP | 0548451 A2 | 5/1992 |
| EP | 1916557 A1 | 4/2008 |

\* cited by examiner

MARK READER WITH REDUCED TRIGGER-TO-DECODE RESPONSE TIME

CROSS-REFERENCE TO RELATED APPLICATIONS

This application is a continuation-in-part of co-pending U.S. patent application Ser. No. 15/664,062, titled "Mark Reader with Reduced Trigger-to-Decode Response Time" and filed Jul. 31, 2017, which is a continuation of U.S. patent application Ser. No. 15/082,459, titled "Mark Reader with Reduced Trigger-to-Decode Response Time," filed Mar. 28, 2016, and issued as U.S. Pat. No. 9,721,134, which is a continuation of U.S. patent application Ser. No. 12/978,156, titled "Mark Reader with Reduced Trigger-to-Decode Response Time," filed Dec. 23, 2010, and issued as U.S. Pat. No. 9,298,963, all of which are incorporated herein by reference in their entirety.

STATEMENT REGARDING FEDERALLY SPONSORED RESEARCH OR DEVELOPMENT

Not applicable.

BACKGROUND OF THE INVENTION

The present invention relates to the field of mark or symbology readers used to read marks (e.g., symbols, barcodes, text characters including alphanumeric, kanji, etc.) directly on objects, and more specifically to a reader that is configured to reduce the time between activation of the reader's trigger and the reader returning a successful decode response.

Mark or symbology reading (also commonly termed barcode scanning) entails the aiming of an image acquisition sensor (e.g., CMOS camera, CCD, etc.) or vision system (e.g., VSoC) contained within the reader at a location on an object that contains a mark, and acquiring an image of the mark. Marks are known and available in a variety of shapes and sizes, and are designed to contain a set of predetermined patterns that represent an ordered group of characters or shapes. The reader, including an attached data processor (e.g., a microcomputer), can derive useful information about the scanned object (e.g., its serial number, type, model, price, etc.) from the mark.

A handheld reader may be directed to step through various types of image capture parameters when reading each mark, such as adjustments to exposure/gain and/or cycling different illuminators ON and OFF, but this takes time, as does integrating/analyzing the resulting images. Generally, for a reader to be considered efficient, the reading process should take place within 200 milliseconds or less. Stepping through adjustments to exposure/gain and/or illumination types, storing results, comparing, and deriving a suitable image may exceed desired time limits.

Referring to FIG. 1, the image decoding process in known symbology readers typically works in the following way. The user initiates the image decoding process by actuating a trigger on a handheld symbology reader, as indicated at process block 50. At this point, the reader may or may not be pointing at the mark to be decoded. By actuating the trigger, an illumination source on or within the reader is turned ON at process block 52 to illuminate the mark to be decoded. The user points the reader and associated illumination at the mark to be decoded so as to cause the illumination to reflect off of the intended mark and back to the reader and onto, i.e., to expose, an image acquisition sensor within the reader to acquire an image of the mark, as indicated at process block 54. Optionally, in addition to acquiring the image, the sensed image may be transferred to a memory (e.g., SDRAM), for storage.

Next, a data processor executes a predetermined algorithm on the stored image data to analyze the image, as indicated at process block 56. The algorithm determines if the image data is acceptable (e.g., meets predetermined threshold values for contrast or sharpness, for example) to attempt decoding the image data, or if modifications are needed to sensor parameters (e.g., exposure/gain) and/or other reader parameter settings (e.g., focus, illumination), as indicated at decision block 58. If modifications are needed, the new sensor and/or other reader parameter settings may be calculated and updated, as indicated at process block 60. As indicated at process block 62, a time delay may need to be inserted for the new parameters to take effect e.g., a rolling shutter sensor may need to complete one readout from every sensor "line" (i.e., row of image pixels).

The process of acquiring an image may be repeated at process block 54, now with the new parameters, and again, the algorithm determines if the image data is acceptable to attempt decoding the image data. If the image data is now acceptable, the image data may be decoded or analyzed for the presence of encoded data mark, as indicated at process block 64.

If data encoded within the mark is found and successfully decoded, as indicated at decision block 66, the reader typically will transmit the decoded data by outputting the decoded data (or a variation thereof), and/or actuating some form of user feedback such as a beeper and/or status lights, and turn the illumination OFF, as indicated at process block 68. The process may then be repeated upon activation of the trigger by the user. If the decoding step does not result in a decoded image, the process typically returns to process block 54 to acquire another image for analysis.

While this solution works well in some applications, one drawback to the above described decode process is the extent of time between the user actuating the trigger to initiate the image decoding process and the eventual successful processing of an image. For example, typical sensor to memory transfer times may be about 17 ms (using for example a global sensor APTINA MT9V024), to 33 ms (using for example a rolling shutter APTINA MT9M001). Parameter update delay typical times may be about 5 ms (global sensor) to 33-66 ms (rolling shutter). It is not uncommon for the parameter update process to be repeated at least three to six times, or more, which can result in an undesirable delay of a few hundred milliseconds or more. Moreover, it is recognized that certain aspects of the mark itself can make it difficult to detect or decode it within a limited number of capture events.

A valued usability metric for handheld readers is the trigger-to-decode response time, or the time between the user actuating the trigger to initiate the image decoding process and the reader returning a successful decode response. What is needed is a mark reader with a reduced trigger-to-decode response time.

BRIEF SUMMARY OF THE INVENTION

The present invention can overcome the disadvantages of the prior art by providing improved systems and methods for reducing the trigger-to-decode response time by performing some image processing on images acquired prior to the user actuating the trigger and thus obtaining a decodable image with reduced delay.

Accordingly, some embodiments comprise a handheld mark reader. The reader comprises a manual trigger and an image acquisition sensor. The sensor acquires at least one pre-trigger image of the mark and at least one post-trigger image of the mark. A pre-trigger calculation process calculates, for the at least one pre-trigger image, at least one pre-trigger image parameter, and a decode process decodes the at least one post-trigger image. A feedback process uses the at least one pre-trigger image parameter to control at least one of a post-trigger image acquisition process and the decode process.

Other embodiments also comprise a handheld mark reader for reading a mark. The mark reader comprises a reader body supporting a manual trigger and an image acquisition sensor, the sensor configured to acquire a pre-trigger image of the mark and a post-trigger image of the mark. A pre-trigger image acquisition process is included, along with a first pre-trigger calculation process that calculates, for the pre-trigger image, at least one parameter of exposure and gain. A first decode process attempts to decode the pre-trigger image. A post-trigger image acquisition process is included, along with a second decode process that attempts to decode the post-trigger image. A feedback process uses the first calculated at least one parameter to control at least one of the post-trigger image acquisition process and the second decode process.

Yet other embodiments comprise a mark reader for decoding an image. The reader comprises a body, and an imager sensor within the body, the image sensor configured to acquire a pre-trigger image of at least a portion of a mark. The body supports a manually operable trigger, the trigger configured to activate the image sensor to acquire a post-trigger image of the at least a portion of the mark. A processor is coupled to the trigger and the image sensor, the processor configured to activate the image sensor prior to operation of the trigger to acquire the pre-trigger image of the at least a portion of the mark and to calculate, for the pre-trigger image acquired prior to operation of the trigger, at least one of auto-exposure, auto-gain, auto-focus, and image decode. The processor is further configured to decode the post-trigger image acquired after activation of the trigger using at least one of the calculated auto-exposure, auto-gain, auto-focus, and image decode.

Consistent with the above, some embodiments include a method for decoding an image of a mark using a handheld mark reader, with the reader including a trigger configured to initiate an acquisition of the image of the mark. The method comprises a variety of steps including a) providing a processor, the processor coupled to the trigger and to an image acquisition sensor; b) activating the processor to acquire a pre-trigger image of the mark prior to activation of the trigger; c) analyzing the pre-trigger image, and based on the analyzing; d) calculating a pre-trigger acquisition parameter; e) adjusting the image acquisition sensor using the calculated pre-trigger acquisition parameter; f) repeating steps b) through e) until the trigger is activated; g) after the trigger is activated, acquiring a post-trigger image of the mark using the calculated pre-trigger acquisition parameter; and h) decoding the post-trigger image.

Some embodiments can include a handheld imaging device for imaging a target. A user-operated trigger can be configured to actuate acquisition of images. An image acquisition sensor can acquire at least one pre-trigger image of the target prior to an actuation of the user-operated trigger and acquire at least one post-trigger image of the target after the actuation of the user-operated trigger. A pre-trigger process can determine, for the at least one pre-trigger image, at least one pre-trigger image parameter. The at least one pre-trigger image parameter can be used to control at least one of a post-trigger image acquisition process and an analysis process for the post-trigger image.

In some embodiments, a handheld imaging device for imaging a target can include a reader body supporting a user-operated trigger and an image acquisition sensor, with the image acquisition sensor configured to acquire images. A pre-trigger image acquisition process can acquire at least one pre-trigger image of the target prior to an actuation of the user-operated trigger. A first pre-trigger calculation process can calculate, for the at least one pre-trigger image, at least one pre-trigger image parameter. A control process can use the calculated at least one pre-trigger parameter to control at least one of: acquisition of at least one post-trigger image of the target after the actuation of the user-operated trigger; and decoding of the at least one post-trigger image.

Some embodiments include a method for decoding an image of a target using a handheld reader, with the handheld reader including an image acquisition sensor and a trigger that is configured to initiate a post-trigger acquisition of the image of the target when the trigger is actuated, with a processor being operatively coupled to the trigger and to the image acquisition sensor. At least one pre-trigger image of the target can be acquired prior to actuation of the trigger. The processor can be activated to analyze the at least one pre-trigger image. Based upon the analyzing of the at least one pre-trigger image, at least one pre-trigger image parameter can be calculated. The calculated at least one pre-trigger image parameter can be used to adjust at least one subsequent pre-trigger image acquisition with the image acquisition sensor. The above-noted operations can be repeated until the trigger is actuated. After the trigger is actuated, at least one post-trigger image of the target can be at least one of acquired using the calculated at least one pre-trigger image parameter, and analyzed based upon the calculated at least one pre-trigger image parameter.

To the accomplishment of the foregoing and related ends, the invention, then, comprises the features hereinafter fully described. The following description and the annexed drawings set forth in detail certain illustrative embodiments of the invention. However, these embodiments are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
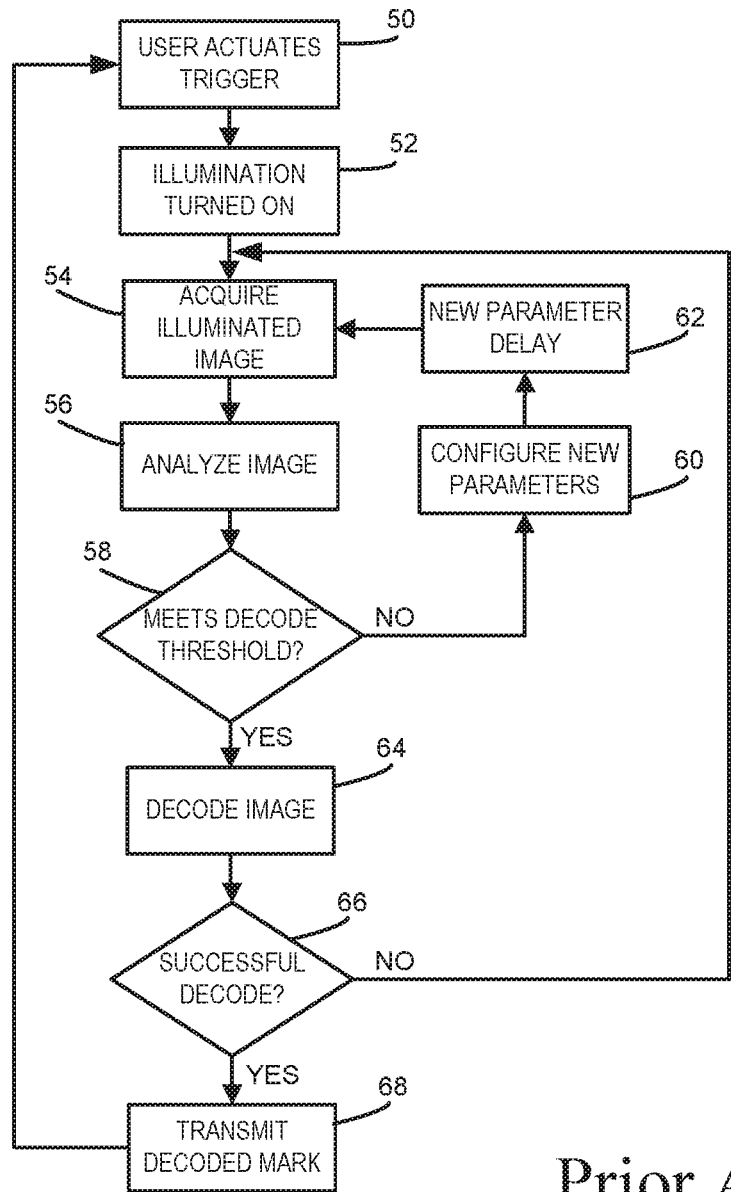
FIG. 1 is a flowchart illustrating a method wherein a reader cycles through a known image decoding process.

Referring to the drawings wherein like reference numerals correspond to similar elements throughout the views, and more specifically, referring to FIG. 2, the present embodiments will be described in the context of an exemplary symbology reader system 100 adapted for handheld operation. The exemplary handheld system is provided with a reader handpiece 102. The handpiece 102 includes a grip section 104 and a body section 106. An image formation system 108, shown in phantom, can be controlled and can direct image data to an onboard embedded processor 110. This processor can include a scanning software application 112 by which illumination may be controlled, images may be acquired and image data may be interpreted, i.e., decoded, into usable information derived from the marks (such as the depicted two-dimensional mark 114). Usable information may include alphanumeric strings, binary data, and binary data along with interpretation information, such as a flag to indicate the binary data should be interpreted as Kanji character data, as non-limiting examples. The decoded information can be directed via a cable 116 or wireless link to a PC or other data storage and/or processing device 118 (e.g., computer, programmable logic controller) having, for example, a display 120, keyboard 122 and mouse 124, where it can be stored and further manipulated using an appropriate application 126.

Alternatively, the cable 116 can be directly connected to an interface (e.g., a USB port) in the reader 102 and an appropriate interface in the computer 118, or the cable 116 may be replaced with a wireless link. In some embodiments, the computer-based application 126 may perform various image interpretation/decoding and illumination control functions as needed. The precise arrangement of the handheld scanning appliance with respect to an embedded processor, computer or other processor is highly variable. For example, a wireless interconnect can be provided in which no cable 116 is present. Likewise, the depicted microcomputer can be substituted with another processing device or multiple processing devices, including an onboard processor(s) or a miniaturized processing unit such as a personal digital assistant or other small-scale computing device.

The scanning application 112 can be adapted to respond to inputs from the reader 102. For example, when the operator toggles a trigger 128, such as a manual trigger on the handheld reader 102, illumination source 130 may be turned ON, and an internal image sensor 132 (within the image formation system 108) may acquire an image of a region of interest 134 on an object 136. The exemplary region of interest includes a two-dimensional mark 114 (as a non-limiting example) that can be used to identify the object 136. Identification and other processing functions may be carried out by the scanning application 112, based upon image data transmitted from the handheld reader 102 to the processor 110. A visual indicator 138 can be illuminated by signals from the processor 110 to indicate a successful read and decode of the mark 114. Audible indicators may also be activated to indicate associated events.

According to one aspect of the embodiments described herein, the exemplary scanning system 100 may be configured to reduce the trigger-to-decode time by acquiring and processing images before the user actuates the trigger 128. In one embodiment, prior to the user actuating the trigger, the reader is configured to enter a feedback loop mode (described further below) with the illumination OFF (i.e., relying on ambient light) and acquires one or more pre-trigger images. In one embodiment, when the user then actuates the trigger, one or more post-trigger images may also be acquired using the settings determined with only the ambient light. This post-trigger image(s) may then be processed by the decoder, while at the same time (e.g., in parallel) the illumination may be turned ON and a post-trigger feedback loop may begin. As used herein, it is to be appreciated that "in parallel" may define a process that is truly in parallel if hardware supported, such as with multiple processors or a multi-core processor, or in parallel may define a process that is interleaved with another process, such as where only one processor may be executing both processes. For marks that may be easily decoded in ambient light (e.g., typical label based codes) the pre-trigger image and/or post-trigger image may be able to be decoded with the illumination ON without revising the settings derived from the post-trigger feedback loop, also giving a reduced trigger-to-decode time.

Figure 2:
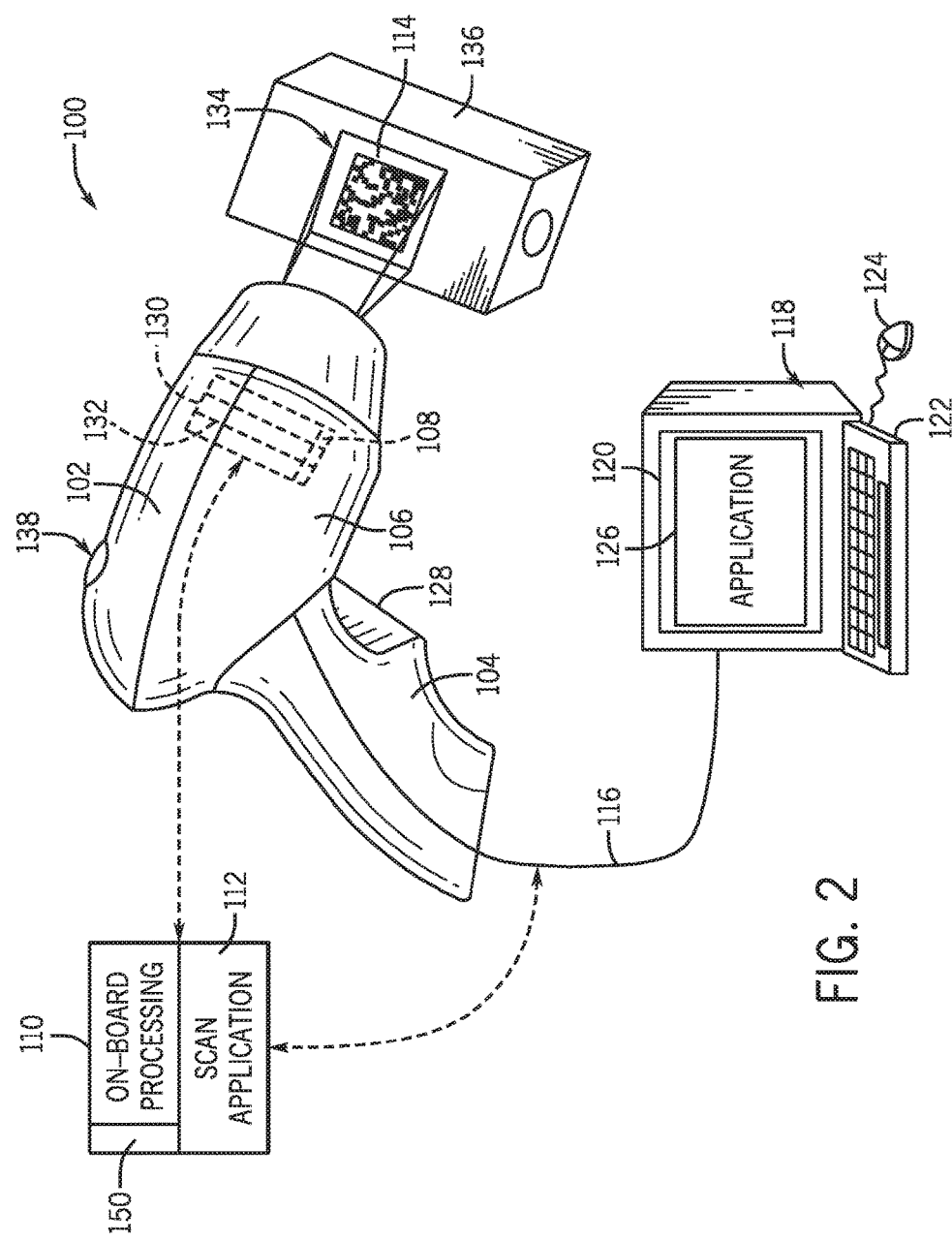
FIG. 2 is a perspective view of a handheld reader constructed in accordance with embodiments of the present invention.
Figure 3:
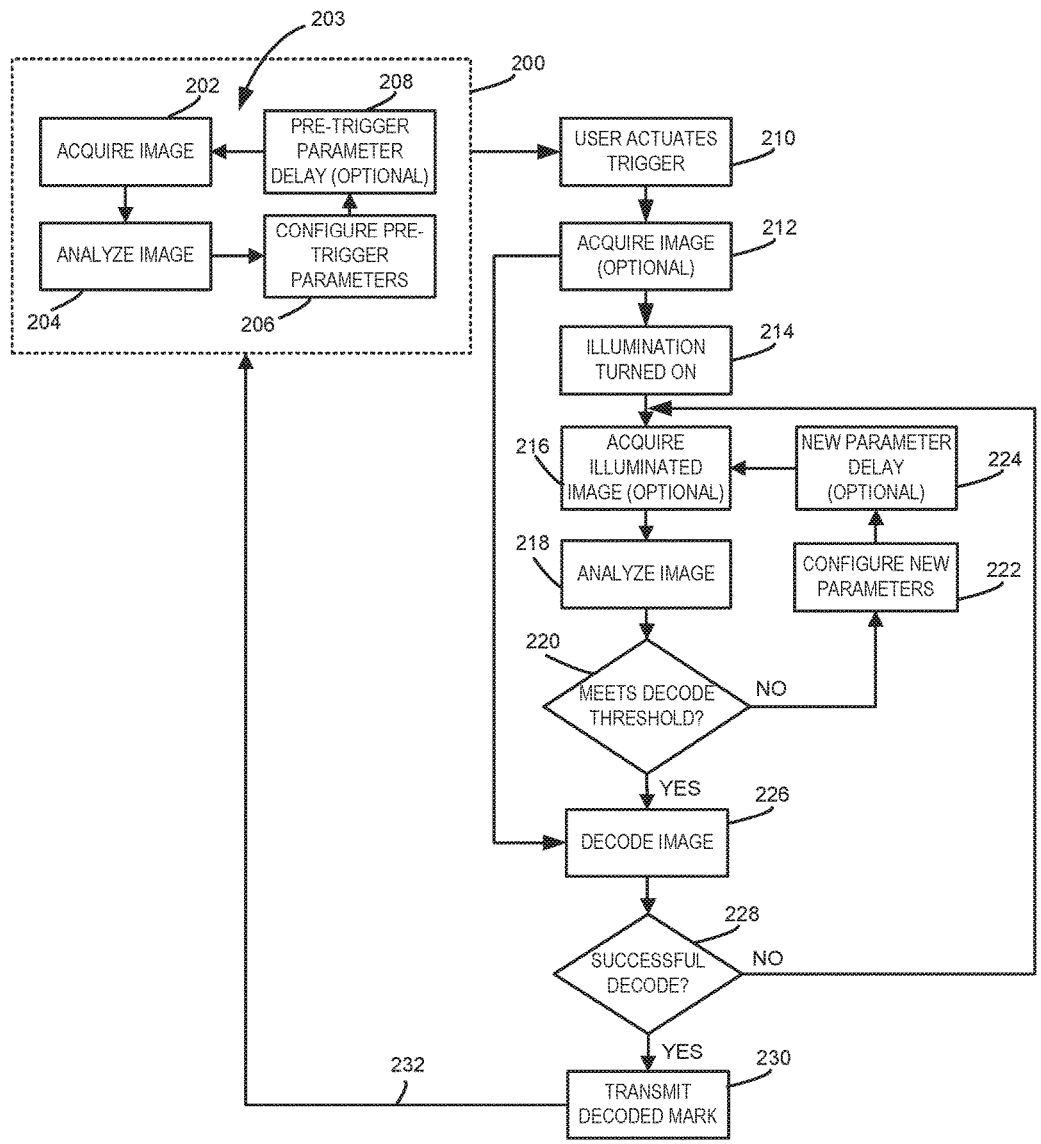
FIG. 3 is a flow chart illustrating an improved method whereby a reader constructed in accordance with embodiments of the present invention cycles through an image decoding process where the time between activation of the reader's trigger and the reader returning a successful decode response is reduced.

Referring to FIGS. 2 and 3, an exemplary method of the image decoding process with the scanning system 100 is illustrated, with a system and method being configured to reduce the trigger-to-decode time. After the scanning system 100 is initially turned ON, and prior to activation of the trigger 128, the reader 102 may default to a pre-trigger feedback loop mode with illumination turned OFF, as indicated at process block 200. Hereinafter, the term "feedback loop" is used generally to refer to a calculation and/or process, e.g., a feedback loop, used for image acquisition, image analysis, and/or system parameter adjustments based on the image analysis. Within the pre-trigger feedback loop mode process block 200, an exemplary feedback loop is shown to comprise a feedback loop 203 including an image acquisition process block 202, an image analysis process block 204, a pre-trigger parameter configuration process block 206, and a pre-trigger parameter delay process block 208. Processor 110, such as a DSP (Digital Signal Processor) or other known processors, executes a predetermined algorithm on the pre-trigger image data acquired at process block 202 to analyze the image, as indicated at process block 204. Based on the analysis, the algorithm may calculate desired system parameters, including, for example, exposure, gain, focus, and/or illumination types, and determines if modifications may be needed to any of the pre-trigger parameters, as indicated at process block 206. As indicated at process block 208, a time delay may be added to allow for the new parameters to take effect.

In one embodiment, the feedback loop 203 of the pre-trigger feedback loop mode process block 200 may be an endless loop up until the user actuates the trigger, for example, and in other embodiments, the feedback loop 203 may be configured to loop for a predetermined number of loop(s), such as one or more than one loop, or for example, until the image analysis determines no new pre-trigger parameter adjustments are needed.

Still referring to FIGS. 2 and 3, with the pre-trigger feedback loop mode process block 200 actively looping, or having looped for a number of loop(s), the user initiates an image decoding process by actuating the trigger 128 on the handheld reader 102, as indicated at process block 210. By actuating the trigger 128, in one optional embodiment, the reader may first acquire one or more post-trigger image(s) at process block 212 again without illumination. In another optional embodiment, by actuating the trigger 128, the reader may omit process block 212 and first acquire one or more post-trigger image(s) at process block 216 after illumination source 130 has been turned ON at process block 214. It is to be appreciated that additional post-trigger images may be acquired after acquiring at least one image at process block 212 and/or 216, and may be acquired with illumination ON or OFF. Once acquired, the image from process block 212, or optionally from process block 216, may be attempted to be decoded or analyzed for the presence of encoded data, as indicated at process block 226.

In yet an additional optional embodiment, in parallel to the attempted decode of the post-trigger image from process block 212, simultaneously with, or in advance of acquisition of the image, illumination source 130 may be turned ON at process block 214 to illuminate the region of interest 134. Next, the reader acquires an illuminated image of the mark, as indicated at process block 216. In some embodiments, the illuminated image may be acquired using at least one of the pre-trigger parameters calculated in the feedback loop 203, such as a pre-calculated focus setting, as a non-limiting example. In any of the embodiments herein, the illumination source 130 can be integrated with the image formation system's 108 standard operating functions, such as strobe and trigger mechanisms, or it can be controlled via the scanning application 112. Optionally, in addition to acquiring the image, the sensed image may be transferred to external memory (e.g., SDRAM).

Next, processor 110, or possibly a separate processor, may execute a predetermined algorithm on the image data to analyze the image, as indicated at process block 218. Thereafter, optionally a determination may be made if the image data is acceptable (e.g., meets predetermined threshold values for contrast or sharpness, for example) to attempt a decoding of the image data, or if modifications may be needed to the system parameters (e.g., exposure/gain) and/or other reader parameter settings (e.g., focus, illumination), as indicated at decision block 220. If modifications are needed, the sensor and/or other reader parameter settings may be updated with the new post-trigger parameters, as indicated at process block 222. As indicated at process block 224, a time delay may need to be inserted for the new parameters to take effect e.g., a rolling shutter sensor may need to complete one readout from every sensor line (i.e., row of pixels).

The process of acquiring an image with illumination ON may be repeated at process block 216, now with the new parameters, and again, the algorithm may determine if the image data may be acceptable to attempt a decoding of the image data. If the image data is now acceptable, the image data may be decoded or analyzed for the presence of encoded data, as indicated at process block 226.

As indicated at decision block 228, if the decoding step does not result in a decoded image, the process typically returns to process block 216 to acquire another illuminated image for analysis. This process can be repeated as many times as required to decode the image, or until the user releases the trigger, or until a timeout condition occurs, for example. After data encoded within the mark is found and successfully decoded, the reader typically will transmit/indicate the decoded data by outputting the decoded data (or a variation thereof), and/or actuating some form of user feedback such as a beeper and/or status lights, and turn the illumination OFF, as indicated at process block 230. At this point, the reader 102 may be configured to return 232 to process block 200 for non-illuminated pre-trigger feedback loop cycle(s).

According to another aspect of the embodiments, and still referring to FIG. 3, the pre-trigger parameters configured in process block 206 may comprise pre-trigger parameters based on ambient light, i.e., with the illumination OFF, along with other pre-trigger parameters, such as exposure, gain, focus, etc. In this way, the pre-trigger parameters may be stored separately from the post-trigger parameters configured in process block 222, which may be based on an illuminated image, i.e., with illumination ON, along with other post-trigger parameters, such as exposure, gain, focus, etc., and the pre-trigger parameters would not be used during the calculation and configuration of the post-trigger parameters. This may help to avoid any interference with configuring parameters in both process block 206 and process block 222.

Figure 4:
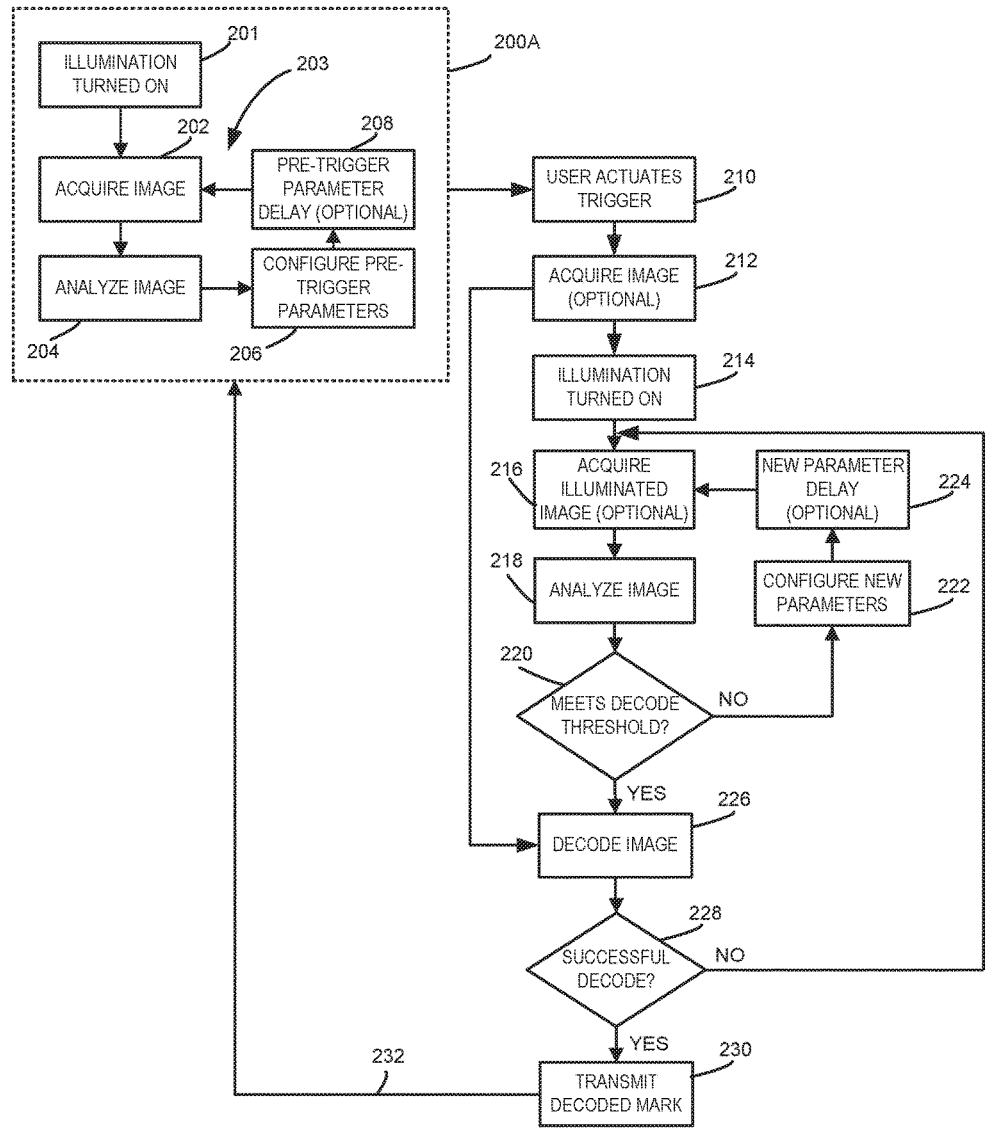
FIG. 4 is a flow chart illustrating an optional method usable with the embodiments of the invention.

According to another aspect of the embodiments, the non-illuminated pre-trigger feedback loop mode process 200 of FIG. 3 may be modified, as indicated at process block 200A in FIG. 4. As can be seen, process block 200A includes optional process block 201, where illumination may be turned ON and used during the pre-trigger feedback loop mode. Turning the illumination ON may provide benefits. For example, a user of the reader 102 may perceive the illumination as feedback of the reader attempting to process (decode) a mark. In addition, with the illumination ON, the image acquired during the pre-trigger feedback loop mode process 200A may be in a better condition for immediate decoding, as indicated at process block 226 in FIG. 3.

Figure 5:
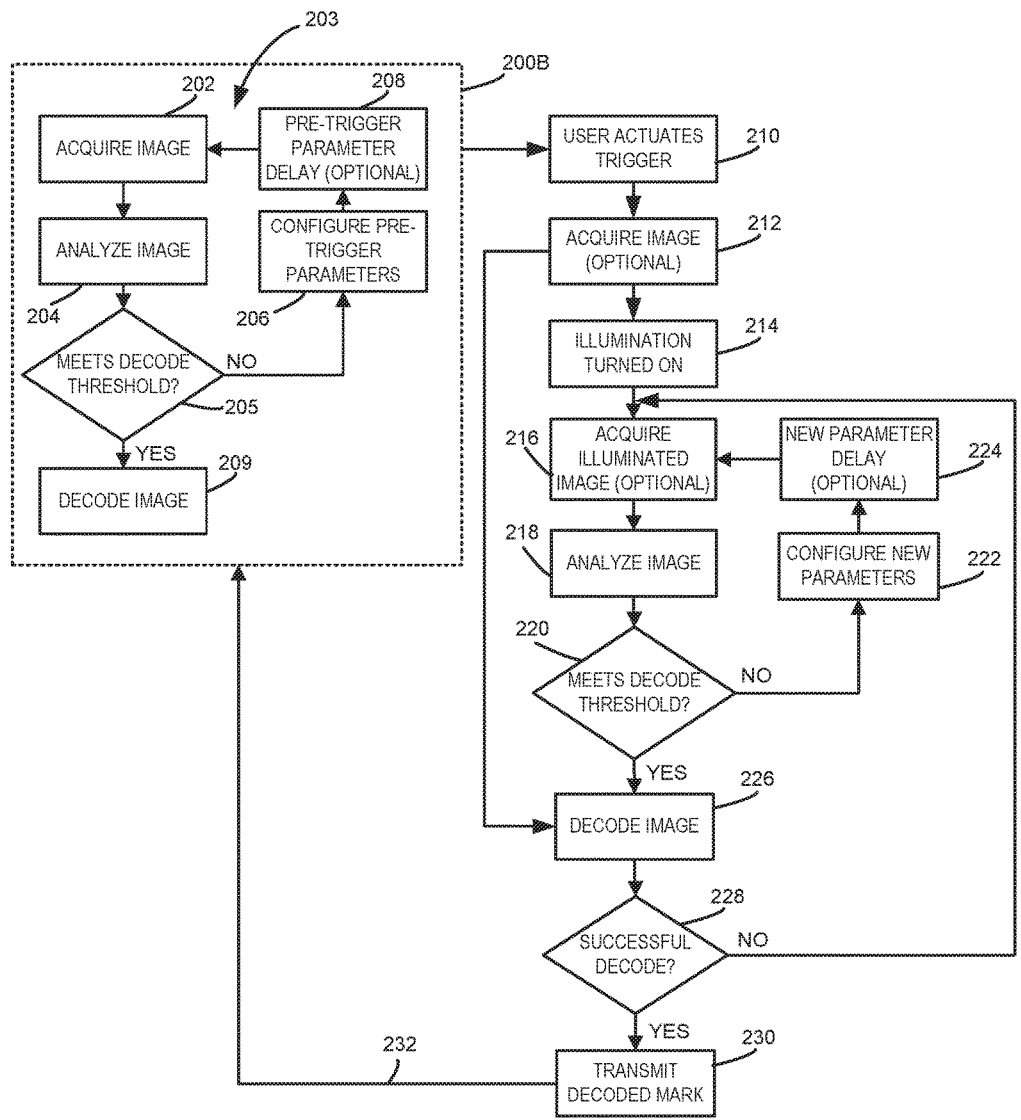
FIG. 5 is a flow chart illustrating an additional optional method usable with embodiments of the invention.

According to another aspect of the embodiments, the non-illuminated pre-trigger feedback loop mode process 200 of FIG. 3 may be modified, as indicated at process block 200B in FIG. 5. In addition to analyzing the image at process block 204, the processor 110 may further calculate if the image data may be acceptable (e.g., meets predetermined threshold values for contrast or sharpness, for example) and is in a condition for an attempt to decode the image data, as indicated at decision block 205. In addition to or in place of process block 204 and/or 205, the image data may be decoded or analyzed for the presence of encoded data, as indicated at process block 209. If modifications to the pre-trigger parameters are still needed, the parameter settings may be updated with the new pre-trigger parameters based on information from the image analysis of process block 204 and/or the attempted image decode of process block 209, as indicated at process block 206.

In addition, in some embodiments, the information from the image analysis of process block 204 and/or the attempted image decode of process block 209 may be used to optimize the post-trigger image acquisition (such as process blocks 212 through 224), and the image decode of process block 226. Information such as the type of mark, orientation, scale, polarity, etc. may be advantageously utilized to improve the time spent to attempt the decode.

In some further embodiments, the decoded data from process block 209 may be used to assist in the determination of a confidence level of the image decode of process block 226. Improved confidence of a decode may be advantageous as it helps to avoid potentially reporting incorrect data.

Figure 6:
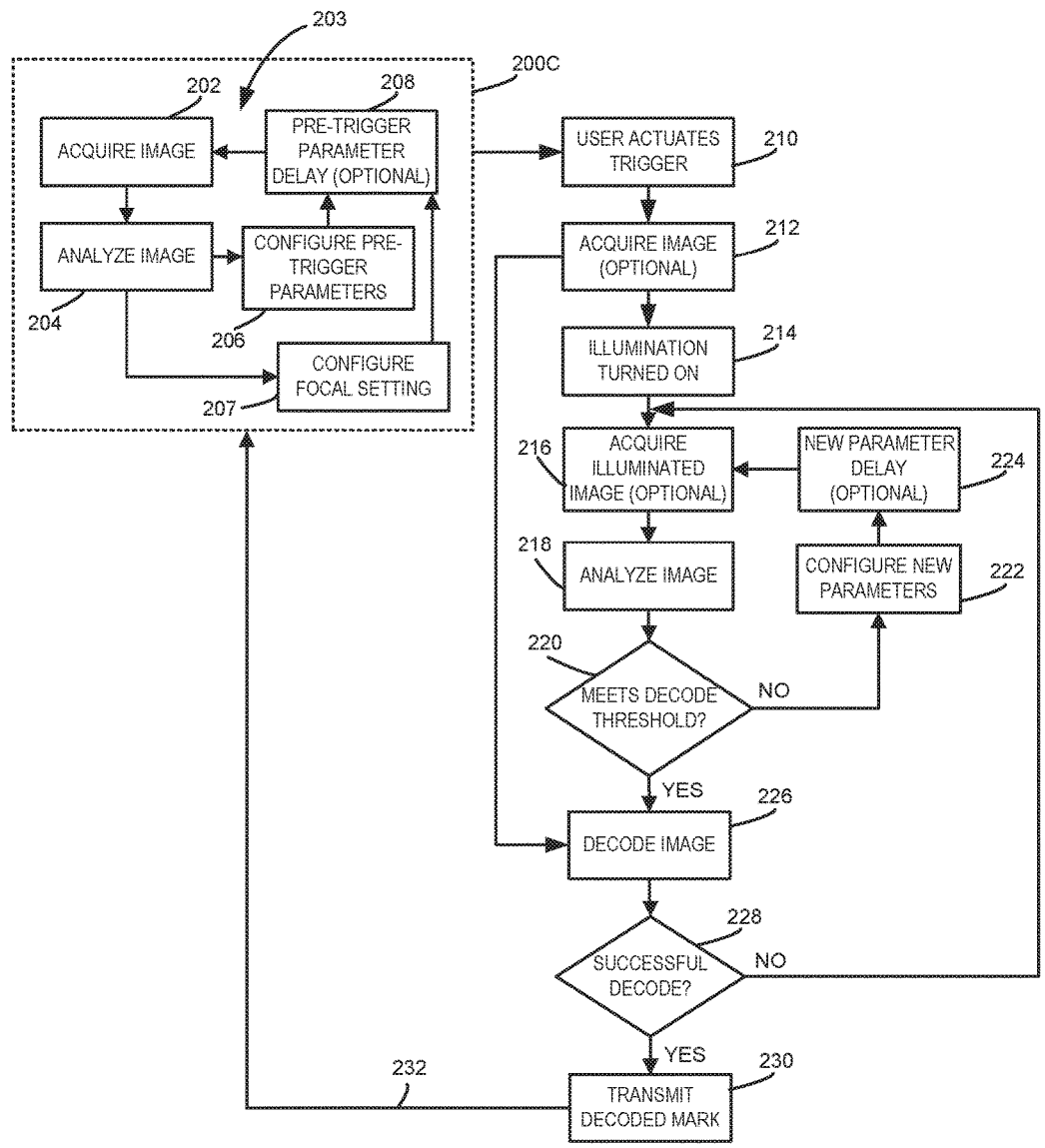
FIG. 6 is a flow chart illustrating an additional optional method usable with embodiments of the invention.

According to another aspect of the embodiments, feedback loop processes described herein, including for example, illumination OFF and ON, may be modified, as indicated at process block 200C in FIG. 6. As can be seen, process block 200C includes optional process block 207 in parallel with process block 206. It is to be appreciated that process block 207 may also be in series within the pre-trigger feedback loop 203, and need not be in parallel with process block 206. Process block 207 may utilize the image analysis to calculate or predict a focal setting for an adjustable component, such as a lens or a mirror in the optical path. In this way, when the user actuates the trigger at process block 210 (see FIG. 3), the focus setting may have already been configured and may avoid additional delay with further focus setting adjustments.

In various embodiments as described herein, a variable lens element may be used, known as a liquid lens. The liquid lens is an optical device that can change focus position based on an applied voltage to a fluid or gel bounded by a flexible polymer, which changes the shape of the lens. Lens response times are typically 20-50 ms. When combined with standard lenses, the liquid lens can focus from device contact to infinity.

Other focal configurations are contemplated as well. For example, a lens or lenses may be incorporated where movement of the lens or lenses may be accomplished using small motors and/or voice coils and/or piezoelectric systems. Other variable lens elements may also be used, for example, by changing the refractive index of a transparent material.

As generally discussed above, in different embodiments, pre-trigger images can generally be analyzed (e.g., to determine different pre-trigger image parameters) in order to inform subsequent acquisition and/or analysis of post-trigger images. As discussed above, for example, illumination settings (e.g., illumination types) can be determined based on analysis of a pre-trigger image, for use during subsequent (e.g., post-trigger) image acquisition. As another example, also as discussed above, analysis of pre-trigger analysis can usefully inform analysis of post-trigger images as part of decoding of the post-trigger images (e.g., as supported by different types of post-trigger processes). In general, implementation of these concepts in different embodiments of the invention can result in increased responsiveness of a code-reading system. Certain specific implementations are further discussed below.

Figure 7:
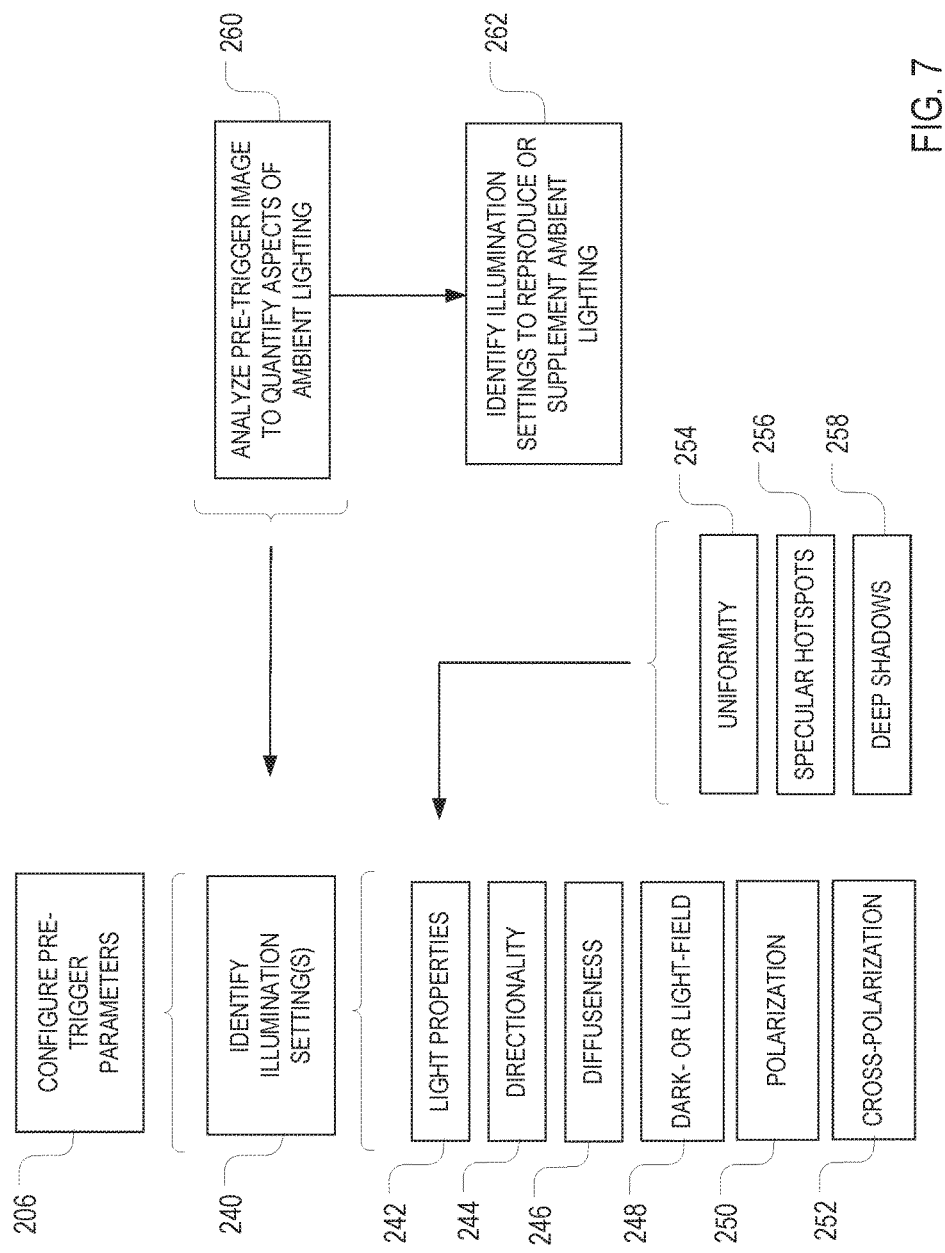
FIG. 7 is a flow chart illustrating an additional optional method usable with embodiments of the invention.

As also generally discussed above, with regard to illumination settings, different types of pre-trigger analysis and post-trigger implementation may be useful. In some embodiments, based on analysis of a pre-trigger image, a pre-trigger process may determine a particular illumination setting (or settings) for use during acquisition of a post-trigger image (e.g., for eventual decoding). In some cases, for example, as illustrated in FIG. 7, configuring pre-trigger parameters at process block 206 can include (e.g., based on analyzing the pre-trigger image at process block 204, as illustrated in FIG. 3) identifying, at process block 240, one or more appropriate illumination settings for subsequent (e.g., post-trigger) image acquisition. In some cases, this can include identifying, at process block 240, two or more appropriate illumination settings. In some cases, illumination settings that are identified at process block 240 can relate to parameters relating to directionality 244, diffuseness 246, dark-field or light-field settings 248 (e.g., whether a code appears as a light region on a dark background, or vice versa), polarization 250, cross-polarization 252, or other light properties 242 such as uniformity 254, presence of specular hotspots 256, presence of deep shadows 258, and so on. For example, a particular code reader may contain or control illumination devices, which may be configured to provide varied types of illumination according to the parameters above or others (e.g., to provide polarized or non-polarized lighting, lighting with different directionality, relatively diffuse or non-diffuse lighting, dark-field or light-field lighting, and so on). Accordingly, for such a reader, it may be possible to identify, at process block 240, particular parameters to be implemented with these devices, for particular illumination operations.

In some embodiments, as also noted above, a pre-trigger image may be acquired with illumination OFF (i.e., relying on ambient light). Correspondingly, in some cases, identifying appropriate illumination settings at process block 240 can include identifying illumination settings to supplement the ambient lighting, or illumination settings to reproduce aspects of the ambient lighting. For example, as illustrated in FIG. 7, identifying illumination settings at process block 240 (and, generally, configuring the pre-trigger parameters at process block 206) can be based upon analyzing, at process block 260 (e.g., as a sub-process of process block 204, as illustrated in FIG. 3), a pre-trigger image to quantify aspects of the ambient lighting. Subsequently, at process block 262, the method can include identifying, at process block 240, illumination settings that reproduce or supplement the ambient lighting (e.g., that complement the ambient lighting to support acquisition of high quality images).

With regard to analysis of post-trigger images, different types of post-trigger analysis (e.g., as part of process block 218, as illustrated in FIG. 3) based upon prior analysis of pre-trigger images may be useful. In some embodiments, for example, an analysis process for a post-trigger image can include filtering of post-trigger images based upon analysis of pre-trigger images (e.g., based upon analysis at process block 204, as illustrated in FIG. 3). For example, as illustrated in FIG. 3, once a pre-trigger image has been acquired at process block 202, the pre-trigger image can be analyzed at process block 204.

Figure 8:
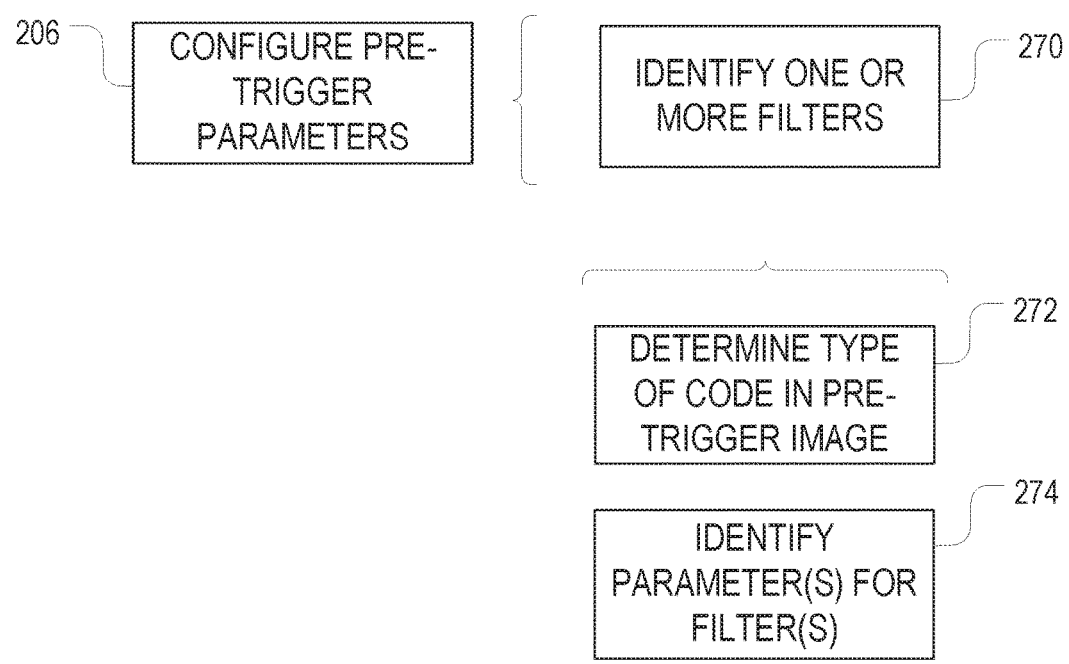
FIG. 8 is a flow chart illustrating an additional optional method usable with embodiments of the invention.

In some cases, as illustrated in FIG. 8, identifying pre-trigger parameters at process block 206 (e.g., as based on analysis at process block 204, as illustrated in FIG. 3) can include analyzing the pre-trigger image to identify, at process block 270, one or more filters (e.g., single filters or specific combinations or sequences of filters) that can be applied to a post-trigger image (e.g., as acquired at process bock 212, as illustrated in FIG. 3) before a decode attempt is made on a post-trigger image (e.g., at process block 226, as illustrated in FIG. 3).

In some implementations, identifying, at process block 270, one or more filters to be applied to an image can include determining, at process block 272, what type of code is included in the pre-trigger image. Later decoding of certain types of codes can sometimes be implemented more quickly or with fewer computing resources if the relevant images are first filtered. However, the particular filter to be applied for optimized efficiency in decoding may depend on what type of code is actually present (or various other factors). Accordingly, for example, analysis of a pre-trigger image at process block 204 can include analyzing the pre-trigger image to identify a particular type of code, so that an appropriate filter can be identified at process block 270.

As an example implementation, a feature that is represented in a pre-trigger image may include a 2D code to be decoded (e.g., once represented in a post-trigger image). In some cases, such a code may be more easily decoded if the relevant image is first filtered appropriately. However, whether a code (e.g., a 2D code) is constructed, for example, from disconnected features (e.g., a dot-matrix code) or from connected features (e.g., squares of a QR code) may sometimes influence which particular image filter(s) could be optimally applied. Accordingly, for example, analysis of the pre-trigger image at process block 204, and determining a type of code at process block 272, can include determining whether the target code in the pre-trigger image includes disconnected features or connected features. An appropriate image filter (if any) can then be identified at process block 270 accordingly.

Similarly, for example, in some case it may be useful to implement a particular type of filter, but parameters for applying the filter may depend on one or more characteristics of a particular image or code. In these cases, for example, identifying an appropriate filter at process block 270 can include identifying, at process block 274, particular parameters for the filter. In some cases, identifying these parameters at process block 274 can be based upon other analysis of a pre-trigger image (e.g., at process block 204).

For example, it may be useful to apply a blurring type filter to a dot-matrix or other disconnected-feature code, so that adjacent, similarly indicated (e.g., similarly dark or light) aspects of the code are connected together (e.g., connected by similarly dark or light pixels). In some cases, however, whether the blurring should be applied to dark or light aspects of the code may depend on whether the information-carrying aspects of the code are dark or light. Accordingly, for example, it may be useful to identify, at process block 272, the polarity of an information-carrying aspect of a code (e.g., a dot in a dot-matrix code), and thereby identify, at process block 274, whether a blurring type filter should blur together adjacent dark features or adjacent light features.

As another example, filters may sometimes usefully be applied, before decoding an image (e.g., at process block 226, illustrated in FIG. 3), in order to provide appropriate contrast enhancement (e.g., to increase the dynamic range of a particular region of an image). Accordingly, for example, it may be useful not only to generally identify, at process block 270, that a contrast enhancement filter should be applied, but also to identify, at process block 274, the degree of contrast enhancement to apply, or one or more regions within an image (e.g., areas smaller than the image as a whole) for such filtering. In other implementations, for example, morphological filters to expand dark or light areas can be applied, as can smoothing filters, as can be useful to remove background textures.

In other implementations, other types of analysis (e.g., at process blocks 204 or 218, as illustrated in FIG. 3) may be possible. For example, some implementations can analyze a pre-trigger image to assess uniformity of illumination and can accordingly identify, at process block 270, one or more filters to be applied to a relevant post-trigger image, or can accordingly identify, at process block 240, appropriate illumination settings for acquisition of a post-trigger image.

Figure 9:
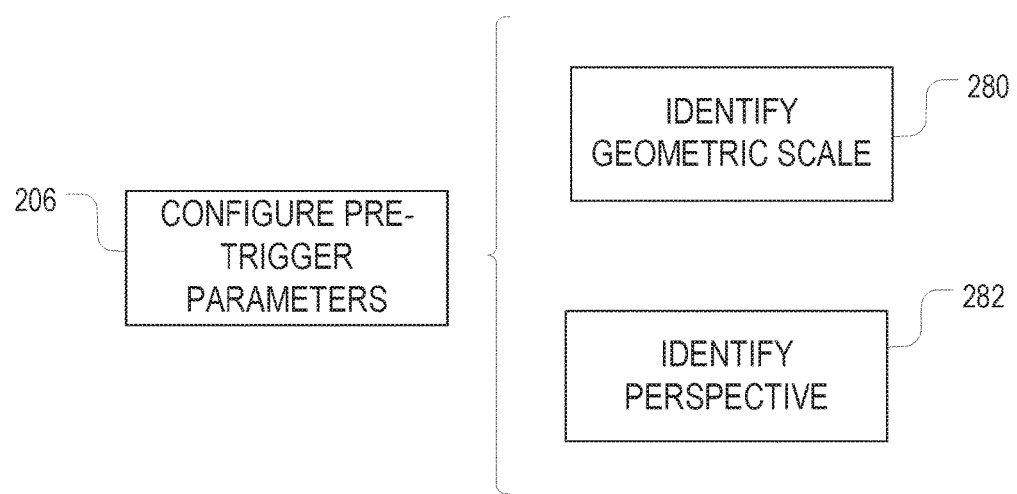
FIG. 9 is a flow chart illustrating an additional optional method usable with embodiments of the invention.

As another example, as illustrated in FIG. 9, some implementations can include analyzing a pre-trigger image (e.g., at process block 204, as illustrated in FIG. 3) in order to identify, at process block 280, a geometric scale of a feature in a pre-trigger image. For example, it may be useful to identify, at process block 280, a geometric scale (e.g., relative dimension within the pre-trigger image as a whole) of a code candidate. As appropriate, this identified scale can then inform later analysis of a post-trigger image. For example, an appropriate geometric transform or other image filter can be applied to a post-trigger image based upon the geometric scale identified at process block 280 (e.g., from an associated pre-trigger image), in order to streamline decoding of the post-trigger image (e.g., at process block 226, as illustrated in FIG. 3).

As another example, also illustrated in FIG. 9, some implementations can include analyzing a pre-trigger image (e.g., at process block 204, as illustrated in FIG. 3) in order to identify, at process block 282, a perspective associated with the pre-trigger image. For example, it may be useful in order to identify an approximate angle (or angles), relative to one or more reference points or features (e.g., horizontal and vertical references) from which a pre-trigger image has been acquired. As appropriate, the identified perspective can then inform subsequent analysis of a post-trigger image. For example, an appropriate transform or other filter can be applied to a post-trigger image to streamline decoding of the post-trigger image, based on an assumption that the orientation of a handheld device relative to an image target may not change significantly between pre-trigger and post-trigger image acquisition.

Consistent with the discussion above, analysis of a pre-trigger image (e.g., at process block 204) and configuration of pre-trigger image parameters (e.g., at process block 206) may be implemented before actuation of a trigger, during actuation of a trigger, after actuation of a trigger, or in any combination thereof. In some implementations, for example, the computational cost of post-trigger analysis (e.g., including post-trigger decoding) or the time from trigger actuation to success decoding can be substantially reduced by implementing any number of analyses on a pre-trigger image (e.g., as discussed above) before the trigger is actuated. In some cases, similar benefits may be obtained even if the analysis of the pre-trigger image is still occurring—or does not begin—until during or after actuation of a trigger. For example, certain analysis of a pre-trigger image can be implemented by a processor of a handheld scanner while a post-trigger image is being written to memory or otherwise processed.

FIGS. 7 through 9 illustrated certain process blocks that may form parts of larger or otherwise more extensive processes, examples of which are illustrated in FIGS. 3 through 6. In some implementations, the processes illustrated in FIGS. 7 through 9 may be implemented as sub-processes of part or all of any one of the process in FIGS. 2 through 8. In some implementations, the processes illustrated in FIGS. 7 through 9 may be implemented as sub-processes in other image acquisition and analysis processes. In some implementations, certain process operations (e.g., particular process blocks of FIGS. 2 through 6) may be implemented temporally between certain process operations represented in FIGS. 7 through 9.

In various embodiments as described herein, it should be understood that the type of data that may be read and captured by the image sensor 132 is not limited to bar codes or other such symbols. In the various embodiments described herein, unless otherwise specified, any type of symbols, characters, or pictures (e.g., driver's license photos), or other data may be captured by the image sensor 132. Where such data is amenable to decoding, the processor 110 of the reader 102 may attempt to decode it; alternatively, the data may be passed along for processing by an inspection system, an optical character recognition system, a host system, or stored locally or remotely for later read-out, as non-limiting examples.

It should be noted that the various features described herein, including use of separate pre- and post-trigger parameters, feedback loops with illumination OFF and ON, adjustable lens with illumination OFF and ON, and the like, may each be used independently or in various combinations with one another, and may be user selectable or non-selectable features, and may also comprise one or more system operating modes.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

Thus, the invention is to cover all modifications, equivalents, and alternatives falling within the spirit and scope of the invention as defined by the following appended claims.

What is claimed is:

1. A handheld imaging device for imaging a target, the handheld imaging device comprising:
    a user-operated trigger configured to actuate acquisition of images;
    an image acquisition sensor that acquires at least one pre-trigger image of the target prior to an actuation of the user-operated trigger and acquires at least one post-trigger image of the target after the actuation of the user-operated trigger;
    a pre-trigger process that determines, for the at least one pre-trigger image, at least one pre-trigger image parameter; and
    an analysis process that analyzes the at least one post-trigger image;
    the analysis process for the post-trigger image being controlled based upon:
        identifying, based on the at least one pre-trigger image parameter, one or more filters to be applied to the at least one post-trigger image; and
        applying the one or more filters to the at least one post-trigger image prior to decoding the at least one post-trigger image.

2. The handheld imaging device according to claim 1, wherein the at least one pre-trigger image parameter is used to control a post-trigger image acquisition process; and
    wherein controlling the post-trigger image acquisition process includes identifying at least one illumination setting for acquiring the at least one post-trigger image based upon the at least one pre-trigger image parameter.

3. The handheld imaging device according to claim 2, wherein identifying the at least one illumination setting based upon the at least one pre-trigger image parameter includes identifying two or more illumination settings from the group consisting of a directionality setting, a diffuseness setting, a dark-field or light-field setting, a polarization setting, and a cross-polarization setting.

4. The handheld imaging device according to claim 2, wherein the at least one pre-trigger image is acquired using ambient lighting, with an illumination source of the handheld imaging device turned off.

5. The handheld imaging device according to claim 4, wherein the at least one illumination setting includes at least one illumination setting selected to reproduce the ambient lighting.

6. The handheld imaging device according to claim 4, wherein the at least one illumination setting includes at least one illumination setting selected to supplement the ambient lighting.

7. The handheld imaging device according to claim 2, wherein the at least one illumination setting for acquiring the at least one post-trigger image is identified before the actuation of the user-operated trigger.

8. The handheld imaging device according to claim 2, wherein the at least one illumination setting for acquiring the at least one post-trigger image is identified at least one of during the actuation of the user-operated trigger and after the actuation of the user-operated trigger.

9. A handheld imaging device for imaging a target, the handheld imaging device comprising:
    a reader body supporting a user-operated trigger and an image acquisition sensor, the image acquisition sensor configured to acquire images;
    a pre-trigger image acquisition process that acquires at least one pre-trigger image of the target prior to an actuation of the user-operated trigger;
    a first pre-trigger calculation process that calculates, for the at least one pre-trigger image, at least one pre-trigger image parameter; and
    a control process that uses the calculated at least one pre-trigger parameter to control at least one of:
        acquisition of at least one post-trigger image of the target after the actuation of the user-operated trigger; and
        decoding of the at least one post-trigger image;
    wherein the control process controls decoding of the at least one post-trigger image based upon:
        using the at least one pre-trigger image parameter to identify one or more of a geometric scale of a feature in the at least one pre-trigger image, and a perspective associated with the at least one pre-trigger image; and
        decoding the at least one post-trigger image based upon the one or more of the geometric scale and the perspective.

10. The handheld imaging device according to claim 9, wherein an illumination source of the handheld imaging device is turned off during acquisition of the at least one pre-trigger image.

11. The handheld imaging device according to claim 9, wherein the control process controls decoding of the at least one post-trigger image based upon:
    identifying, based on the at least one pre-trigger image parameter, one or more filters to be applied to the at least one post-trigger image; and
    applying the one or more filters to the at least one post-trigger image prior to decoding the at least one post-trigger image.

12. The handheld imaging device according to claim 11, wherein identifying the one or more filters is based upon analyzing the at least one pre-trigger image to identify a type of code included in the at least one pre-trigger image.

13. The handheld imaging device according to claim 12, wherein identifying the type of code includes identifying whether a code represented in the at least one pre-trigger image includes disconnected features.

14. The handheld imaging device according to claim 12, wherein identifying the type of code includes identifying a polarity of information-carrying aspects of a code represented in the at least one pre-trigger image.

15. The handheld imaging device according to claim 11, wherein the one or more filters include one or more of a blurring type filter, a contrast-enhancement filter, and a filter to be selectively applied to one or more regions within the at least one post-trigger image.

16. A method for decoding an image of a target using a handheld reader, the handheld reader including an image acquisition sensor and a trigger that is configured to initiate a post-trigger acquisition of the image of the target when the trigger is actuated, with a processor being operatively coupled to the trigger and to the image acquisition sensor, the method comprising:
 a) acquiring at least one pre-trigger image of the target prior to actuation of the trigger;
 b) activating the processor to analyze the at least one pre-trigger image;
 c) based upon the analyzing of the at least one pre-trigger image, calculating at least one pre-trigger image parameter;
 d) using the calculated at least one pre-trigger image parameter to adjust at least one subsequent pre-trigger image acquisition with the image acquisition sensor;
 e) repeating operations b) through d) until the trigger is actuated; and
 f) after the trigger is actuated, at least one of:
  acquiring at least one post-trigger image of the target using the calculated at least one pre-trigger image parameter; and
  analyzing the at least one post-trigger image based upon the calculated at least one pre-trigger image parameter;
  wherein analyzing the at least one post-trigger image includes decoding the at least one post-trigger image based upon:
   identifying, based on the at least one pre-trigger image parameter, one or more filters to be applied to the at least one post-trigger image; and
   applying the one or more filters to the at least one post-trigger image prior to decoding the at least one post-trigger image.

17. The method according to claim 16, wherein acquiring the at least one post-trigger image of the target using the calculated pre-trigger image parameter includes using the at least one pre-trigger image parameter to identify at least one illumination setting for acquiring the at least one post-trigger image.

18. The method according to claim 17, wherein the at least one pre-trigger image is acquired with an illumination source of the handheld reader turned off.

* * * * *